(12) United States Patent
Ballewar

(10) Patent No.: US 11,142,048 B2
(45) Date of Patent: Oct. 12, 2021

(54) OPERATOR CAB WITH ACTUATED FRONT DOOR

(71) Applicant: Deere & Company, Moline, IL (US)

(72) Inventor: Sachin Ballewar, Pune (IN)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/296,684

(22) Filed: Mar. 8, 2019

(65) Prior Publication Data

US 2020/0282812 A1 Sep. 10, 2020

(51) Int. Cl.
*B60J 5/02* (2006.01)
*E02F 9/16* (2006.01)

(52) U.S. Cl.
CPC ............... *B60J 5/02* (2013.01); *E02F 9/163* (2013.01)

(58) Field of Classification Search
CPC ..................... B60J 5/02; E02F 9/193
See application file for complete search history.

(56) References Cited

U.S. PATENT DOCUMENTS

| | | | | |
|---|---|---|---|---|
| 2,669,499 A * | 2/1954 | Vanderplank | ......... | E06B 3/5045 312/322 |
| 4,503,637 A * | 3/1985 | Parente | ........... | E05D 15/06 49/118 |
| 4,563,625 A * | 1/1986 | Kornbrekke | ........... | B66B 13/143 318/603 |
| 4,620,743 A | 11/1986 | Eke | | |
| 5,482,104 A | 1/1996 | Lichy | | |
| 5,577,795 A * | 11/1996 | Shinsen | ............ | B60J 5/062 296/190.11 |
| 5,765,985 A * | 6/1998 | Johnson | ............ | B65F 3/201 414/511 |
| 5,813,818 A * | 9/1998 | McNeilus | ............ | B65F 3/001 414/407 |
| 5,997,072 A * | 12/1999 | Parkinson | ............ | B60J 5/12 296/146.8 |
| 6,189,954 B1 * | 2/2001 | Martin, Jr. | ............ | B60J 1/02 296/190.03 |
| 6,286,260 B1 * | 9/2001 | Grabowski | ......... | E05D 15/1047 49/216 |
| 6,611,990 B1 * | 9/2003 | Sogo | ............. | B60J 5/0419 16/87 R |
| 7,360,824 B2 * | 4/2008 | Nakayama | ............. | B60J 5/0487 296/155 |

(Continued)

FOREIGN PATENT DOCUMENTS

GB 2442004 A 3/2008

*Primary Examiner* — Lori L Lyjak

(57) ABSTRACT

An operator cab is mounted on a chassis of a mobile work vehicle. The cab includes a back panel, a pair of opposing side panels, and a roof panel. The side panels and the roof panel each have a first edge proximate the back panel and a second edge opposite the first edge, the second edges defining a door opening. A door is proximate the door opening and movable to a closed position defining a front barrier or an open position alongside the cab. A drive system is connected to the door to move the door about a pivot point near the door opening to an open position from the closed position to allow for an operator to ingress and egress through the door opening. The door when in the open position being secured between a boom arm of the mobile work vehicle and alongside the at least one of the side panel of the cab.

8 Claims, 13 Drawing Sheets

(56) References Cited

U.S. PATENT DOCUMENTS

| | | | |
|---|---|---|---|
| 7,438,349 B2 * | 10/2008 | Jo | B60J 5/0487 |
| | | | 296/155 |
| 7,585,016 B2 | 9/2009 | Wehrenberg | |
| 7,934,767 B2 * | 5/2011 | Kim | B60J 5/062 |
| | | | 296/190.11 |
| 8,016,345 B1 | 9/2011 | Goddard et al. | |
| 8,454,081 B2 * | 6/2013 | Kim | B60J 5/062 |
| | | | 296/190.11 |
| 10,556,492 B2 * | 2/2020 | Gupta | B60J 5/0497 |
| 10,626,659 B2 * | 4/2020 | Herrmann | E05F 15/616 |
| 2004/0124662 A1 * | 7/2004 | Cleland | E05F 15/43 |
| | | | 296/146.4 |
| 2006/0181108 A1 * | 8/2006 | Cleland | E05F 15/43 |
| | | | 296/146.4 |
| 2006/0197357 A1 | 9/2006 | Catania | |
| 2009/0192682 A1 | 7/2009 | Ciarla et al. | |
| 2013/0067817 A1 * | 3/2013 | Sorensen | E05F 15/627 |
| | | | 49/30 |
| 2013/0170932 A1 * | 7/2013 | Neufeldt | B65F 3/207 |
| | | | 414/493 |
| 2017/0191244 A1 * | 7/2017 | Berkemeier | E02F 3/3414 |
| 2018/0065448 A1 * | 3/2018 | Reynolds | B60H 1/00407 |

* cited by examiner

OPERATOR CAB WITH ACTUATED FRONT DOOR

FIELD OF THE DISCLOSURE

The present disclosure relates generally to a construction machine, and in particular to an operator cab of the machine having a movable front door and an associated actuator for moving the door.

BACKGROUND OF THE DISCLOSURE

Construction machines, such as a skid steer, generally include a chassis supporting wheels or tracks and a cab in which the operator sits and operates the construction machine. The operator cab has a small interior space, just large enough for the operator to sit and operate the controls for the wheels or tracks and a pair of lift arms. The operator is typically equipped with a pivoting swing-out front door panel, providing a front door opening through which the operator may enter and exit the small interior space. Thus, a skid steer can operate in areas that are otherwise off limits to larger equipment. Other skid steers may have a folding or translatable door that moves along a track. Such configurations often do not allow for open door operations, create an obstruction for the operator or further cramp operations inside the small cab when the front door folds or opens into the interior space of the cabin.

SUMMARY OF THE DISCLOSURE

In one example, an operator cab is mounted on a chassis of a mobile work vehicle. The cab includes a back panel, a pair of opposing side panels, and a roof panel. The side panels and the roof panel each have a first edge proximate the back panel and a second edge opposite the first edge, the second edges defining a door opening. A door is proximate the door opening and movable to closed or open positions and defining a front barrier when in the closed position. An actuator is connected to the door to move the door about a pivot point near the door opening to an open position from the closed position to allow for an operator to ingress and egress through the door opening. The door when in the open position being secured alongside at least one of the side panels of the cab.

In another example, a method for opening and closing an operator cab, includes providing a back panel, a pair of opposing side panels and a roof panel. The side panels and the roof panel each have a first edge proximate the back panel and a second edge opposite the first edge. The second edges of the side panels and the roof panel defining a door opening. The method also includes providing a movable door proximate the door opening, connecting an actuator to the door, and actuating the actuator to pivot the door about a pivot point to move the door from a closed position proximate the door opening to an open position alongside at least one of the side panels.

Other aspects of the disclosure will become apparent by consideration of the detailed description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
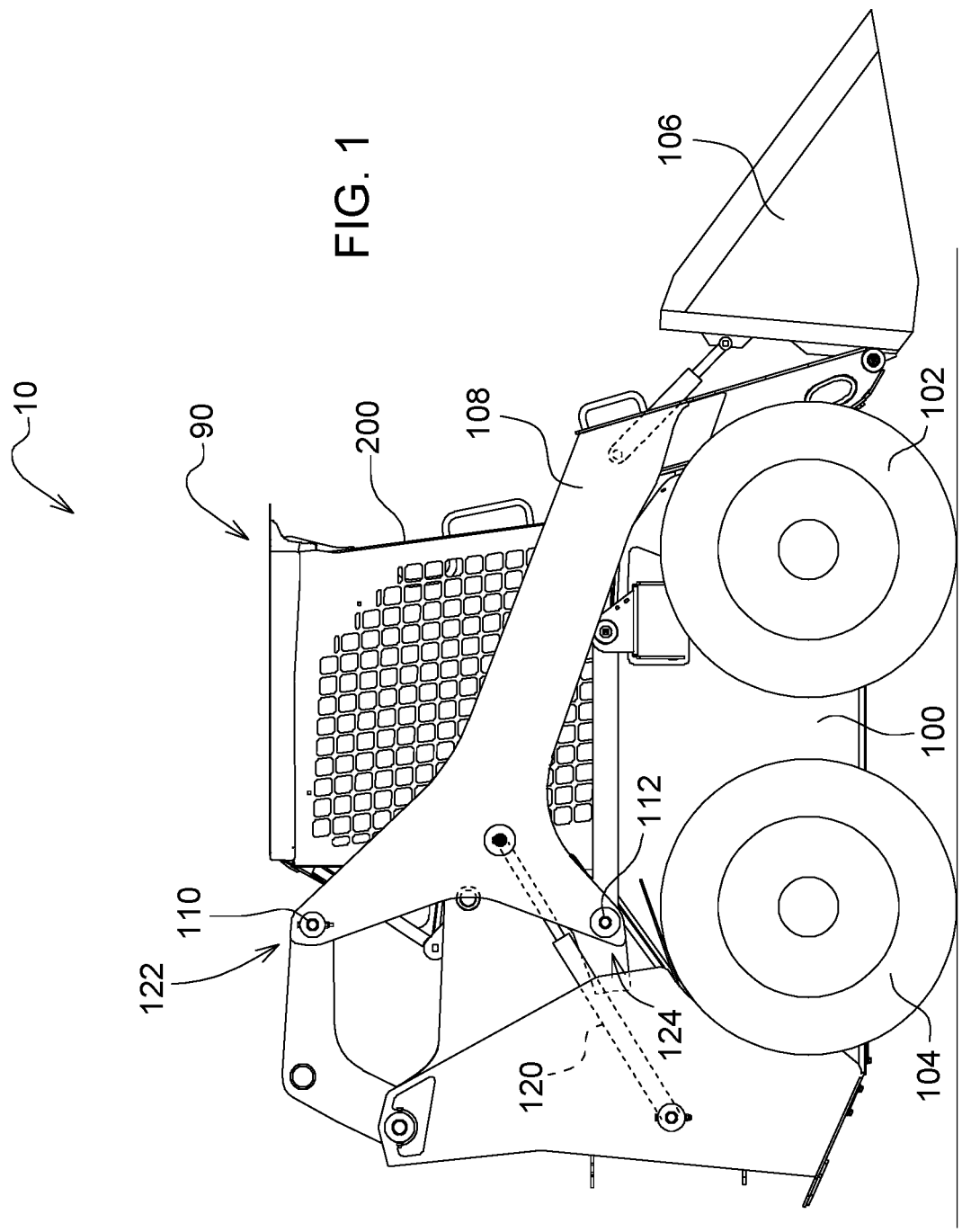
FIG. 1 illustrates a side elevation of a prior art skid steer with its lift arms lowered.

Referring to FIG. 1, an exemplary embodiment of a machine, such as a skid steer 10, is shown. This disclosure is not intended to be limited to a skid steer loader, however, but rather may include any agricultural, construction, or forestry machinery. The skid steer 10 can be provided with a cab 90, chassis 100 and a ground-engaging mechanism mounted thereto for moving along the ground, e.g., a pair of front wheels 102 and a pair of rear wheels 104. In another aspect, such as a compact track loader, the ground-engaging mechanism can be a drive track disposed on each side of the machine. In a conventional skid steer, the operator can manipulate controls from inside a cab 90 to drive the wheels on the right or left side of the machine 10 at different speeds to thereby steer the machine 10 in a conventional manner.

Figure 2:
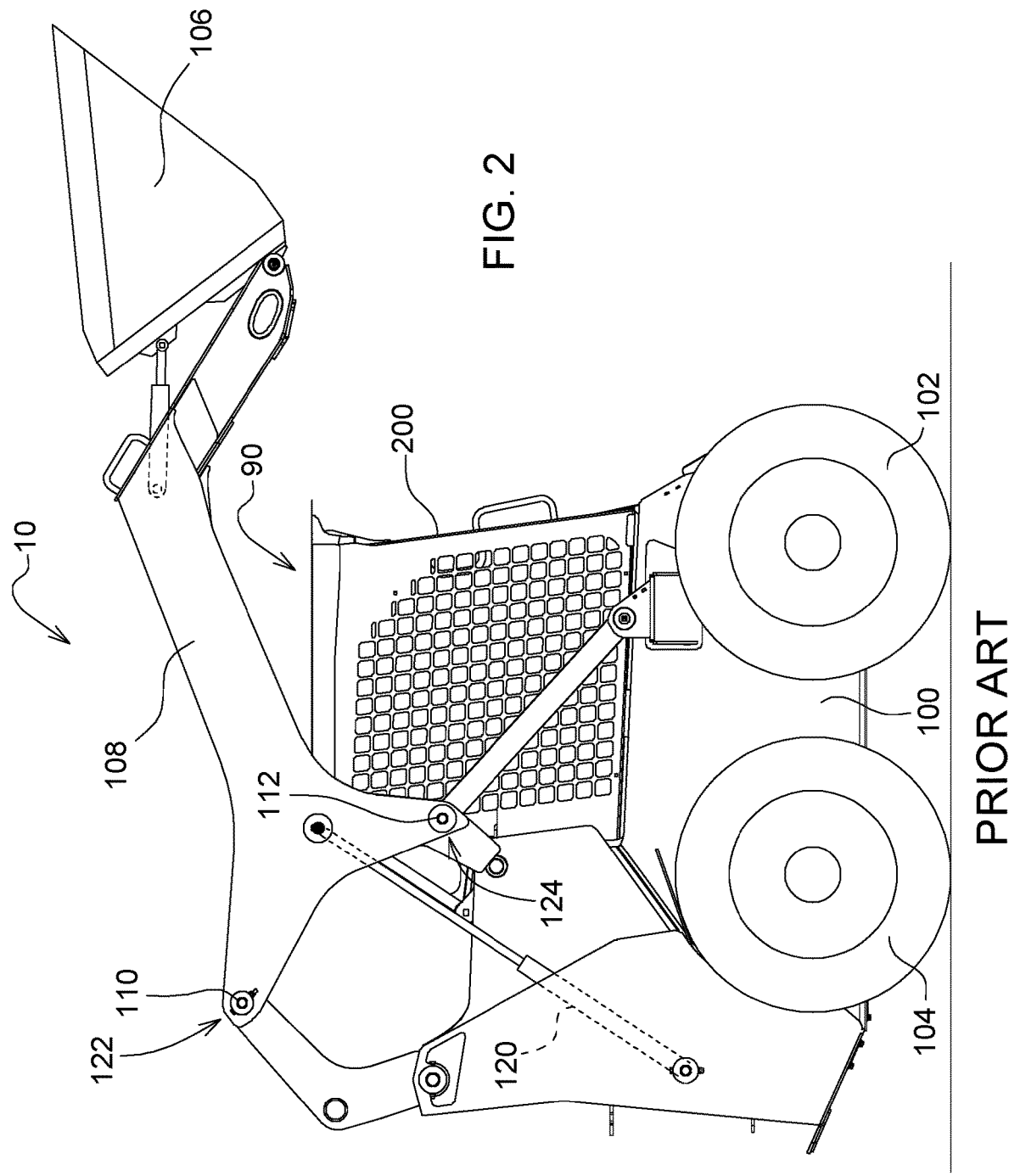
FIG. 2 illustrates a side elevation of a prior art skid steer with its lift arms raised.

The machine 10 can be further provided with a work implement or tool for performing a desired operation. In FIG. 1, the skid steer 10 includes a loader bucket 106 for collecting material therein and transporting said material to a desired location. The loader bucket 106 can be pivotally coupled to a forward portion of a pair of boom arms 108 positioned on each side of the machine 10. In FIG. 1, the loader bucket 106 is shown at a minimum height. To raise the bucket 106, each of the pair of boom arms 108 is connected to an upper link 110 at a first location 122 and a lower link 112 at a second location 124. The upper link 110 and lower link 112 are also attached to the chassis 100 depending on the type or style of skid steer. A hydraulic actuator 120 is pivotally secured at one end to the chassis 100 and coupled to the boom arm 108 at an opposite end thereof. However, referring now to FIG. 2, the loader bucket 106 can be raised from the minimum height to various other heights. In either raised or lowered positions, the loader bucket 106 effectively blocks the operation of a conventional swing out cab door.

Figure 3:
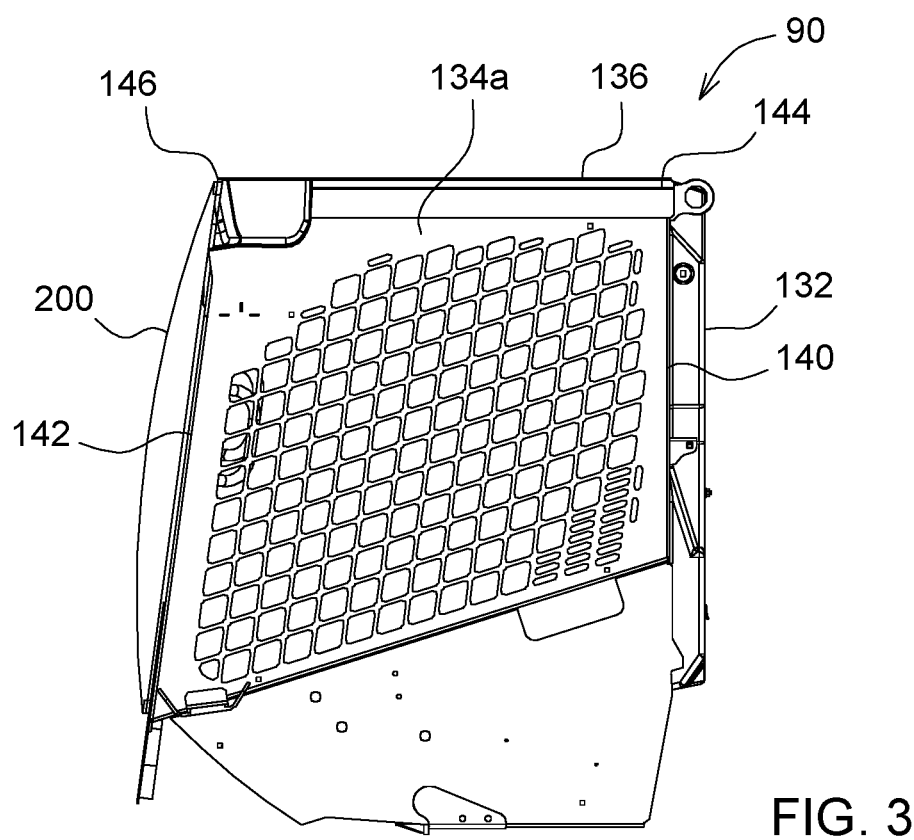
FIG. 3 illustrates a side elevation of an operator cab in accordance with one embodiment.
Figure 4:
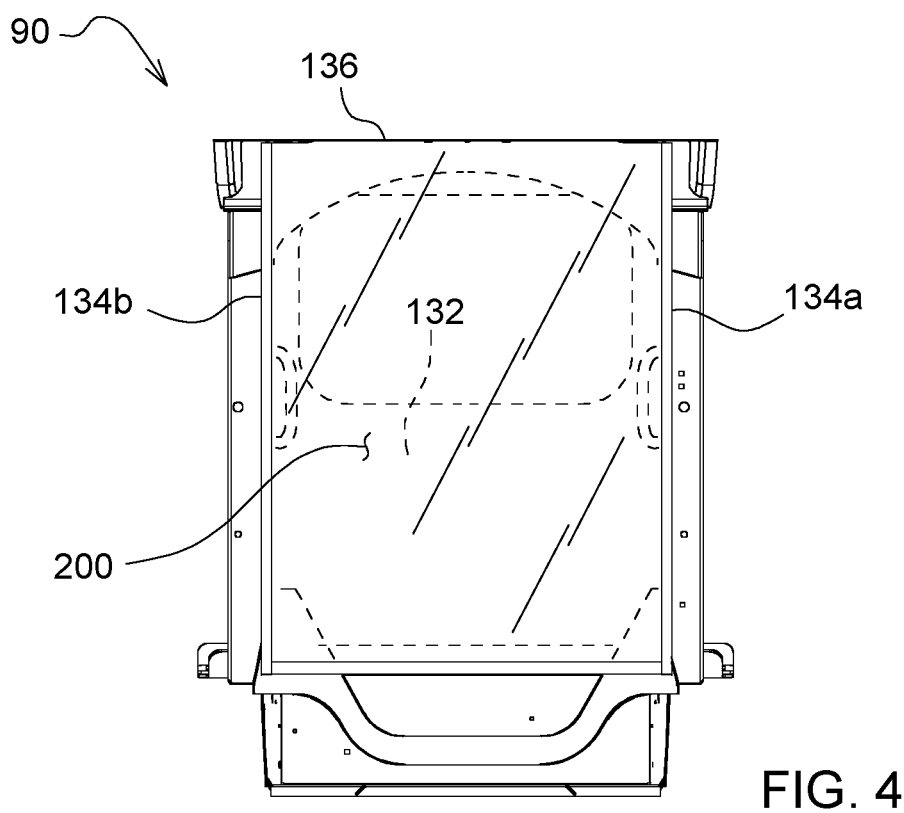
FIG. 4 illustrates a front elevation of an operator cab in accordance with one embodiment.

Referring now to FIGS. 3-4, the cab 90 may be comprised of a back panel 132, a pair of opposing side panels 134*a-b*, and a roof panel 136 mounted on chassis 100, wherein the side panels 134*a-b* and the roof panel 136 each have a first edge proximate the back panel 132 and a second edge opposite the first edge. For example, with respect to roof panel 136 in FIG. 3, the first edge 144 is proximate the top of back panel 132 while the second edge 146 is proximate the top of a door 200. With respect to side panels 134*a-b* in FIG. 3, the first edge 140 of the left side panel 134*a* is proximate the back panel 132 while the second edge 142 is opposite the first edge 140. It can also be appreciated that the first edge 141 (not shown) of the right-side panel 134*b* is proximate the back panel 132 while the second edge 143 is opposite the first edge similar to the left side panel 134*a*. Thus, the second edges 142, 143 of the side panels 134*a-b*, respectively, and the second edge 146 of the roof panel 136 define the top, left and right sides of a door opening.

Referring further to FIGS. 3-4, the door 200 is proximate the door opening, i.e., near or next to the second edges 142, 143 of side panels 134*a-b*, and the second edge 146 of roof panel 136. The door 200 is movable to a closed position (as shown in FIG. 4) defining a front barrier, an open position wherein the door is secured alongside the cab 90 or somewhere in between depending upon the needs of the operator. The front barrier created by door 200 can be a mostly rigid front barrier; however, it can be appreciated by one ordinary skill that the degree of rigidity may vary according to the needs of the application in which skid steer 10 is used. If, for example, the skid steer 10 is used to haul large rocks, one of ordinary skill may construct a door 200 having significant degree of rigidity.

Figure 5:
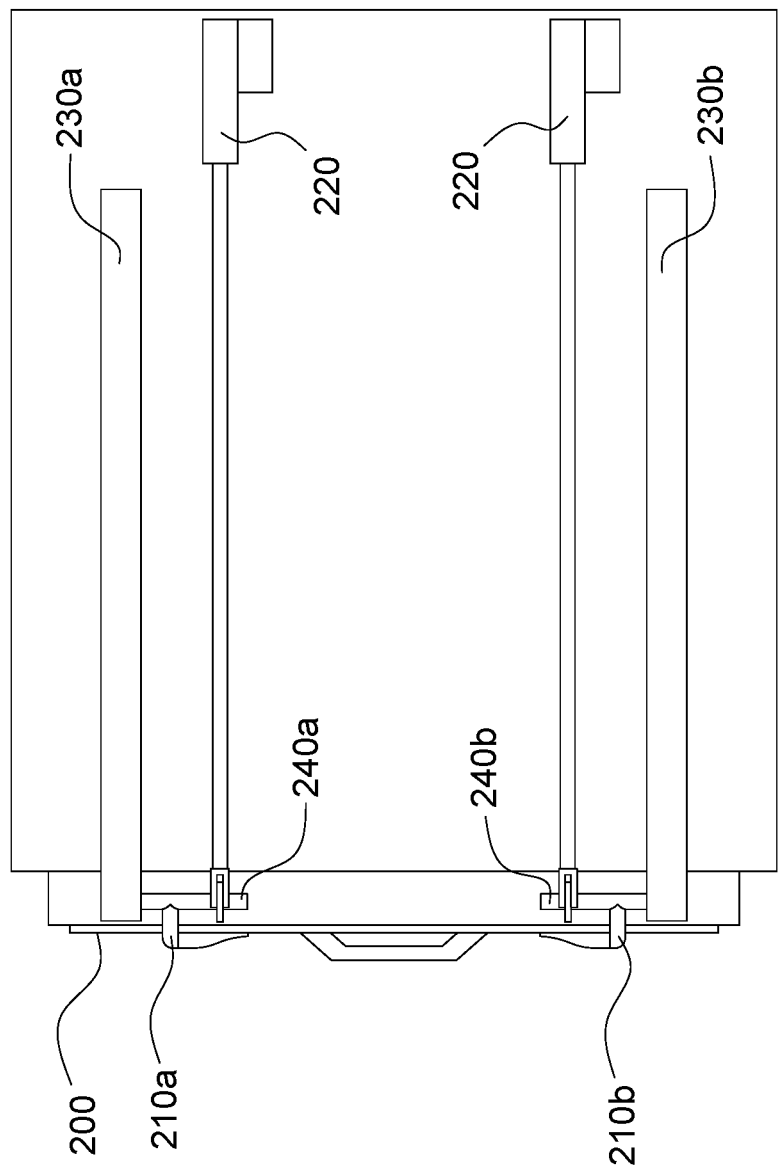
FIG. 5 illustrates a side elevation view of the operator cab wherein the door is fully closed.
Figure 6:
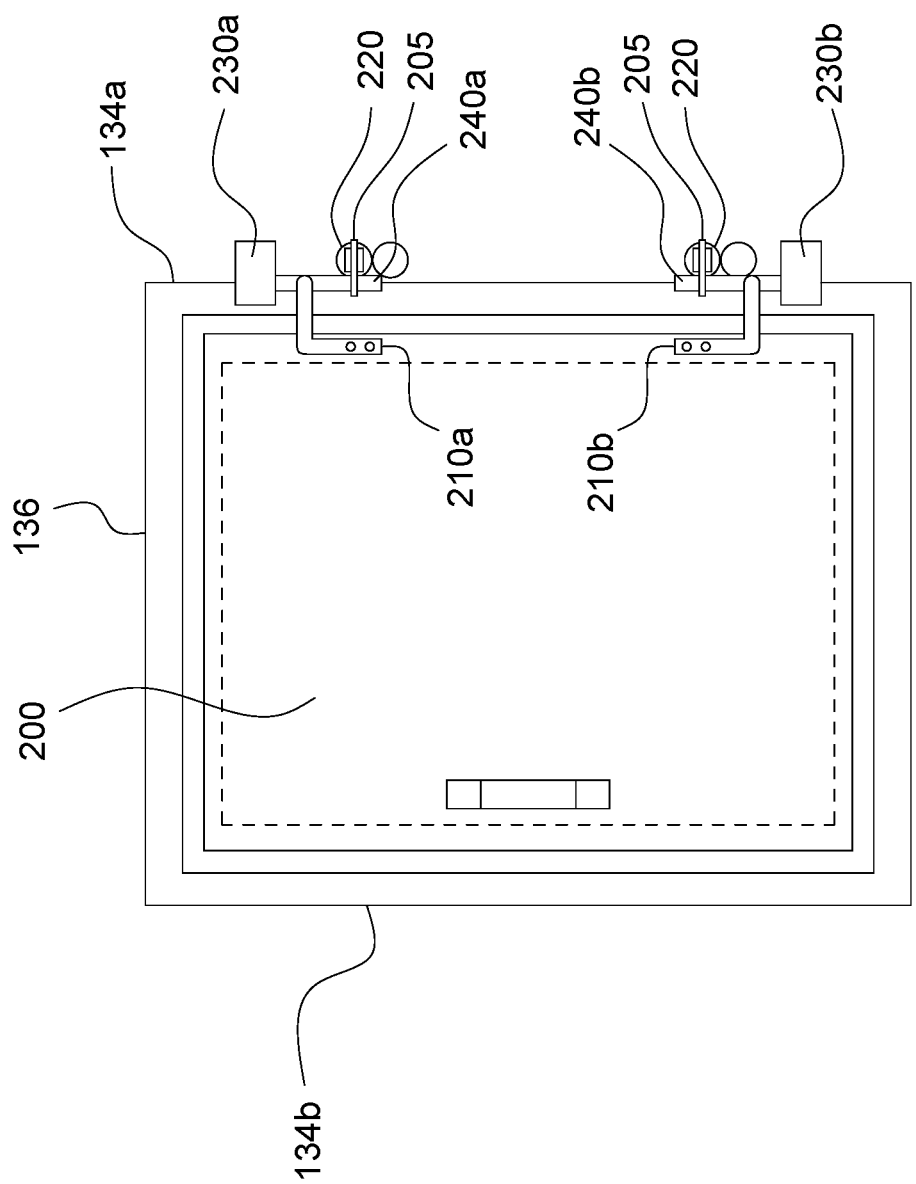
FIG. 6 illustrates a front elevation view of the door of the operator cab.
Figure 7A:
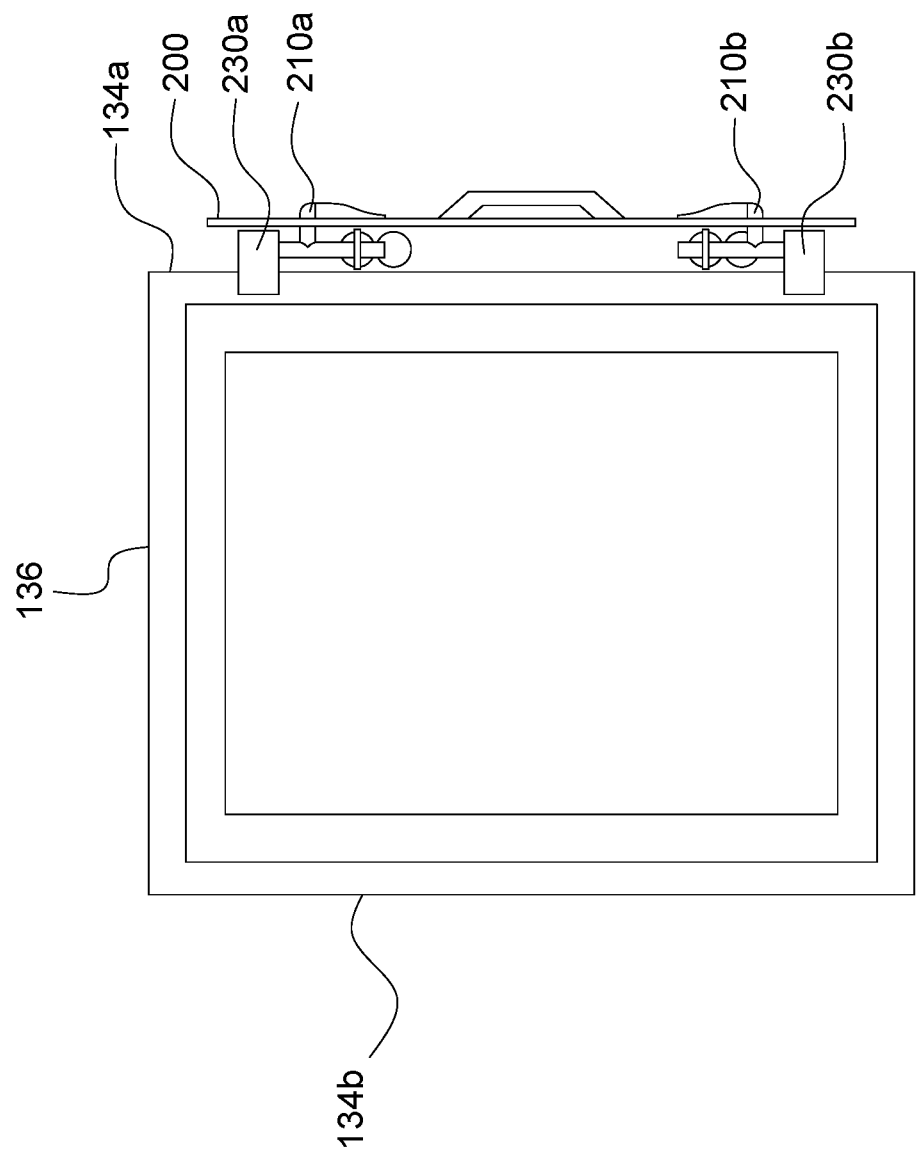
FIG. 7A illustrates a front elevation of the operator cab according to FIG. 6 wherein the door has been opened but not fully retracted alongside the cab.
Figure 7B:
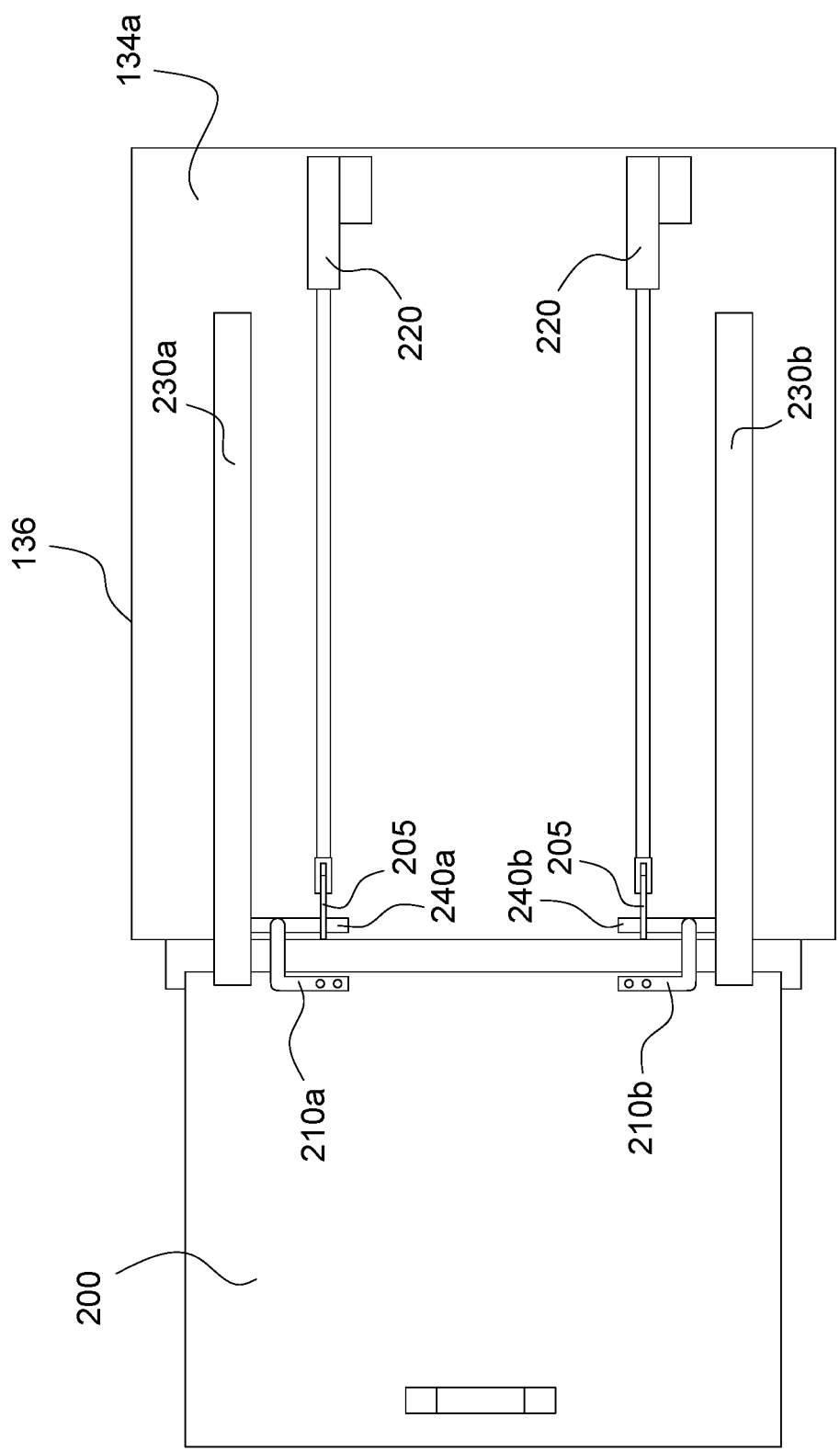
FIG. 7B illustrates a side elevation of the operator cab according to FIG. 6 wherein the door has been opened but not fully retracted alongside the cab.
Figure 7C:
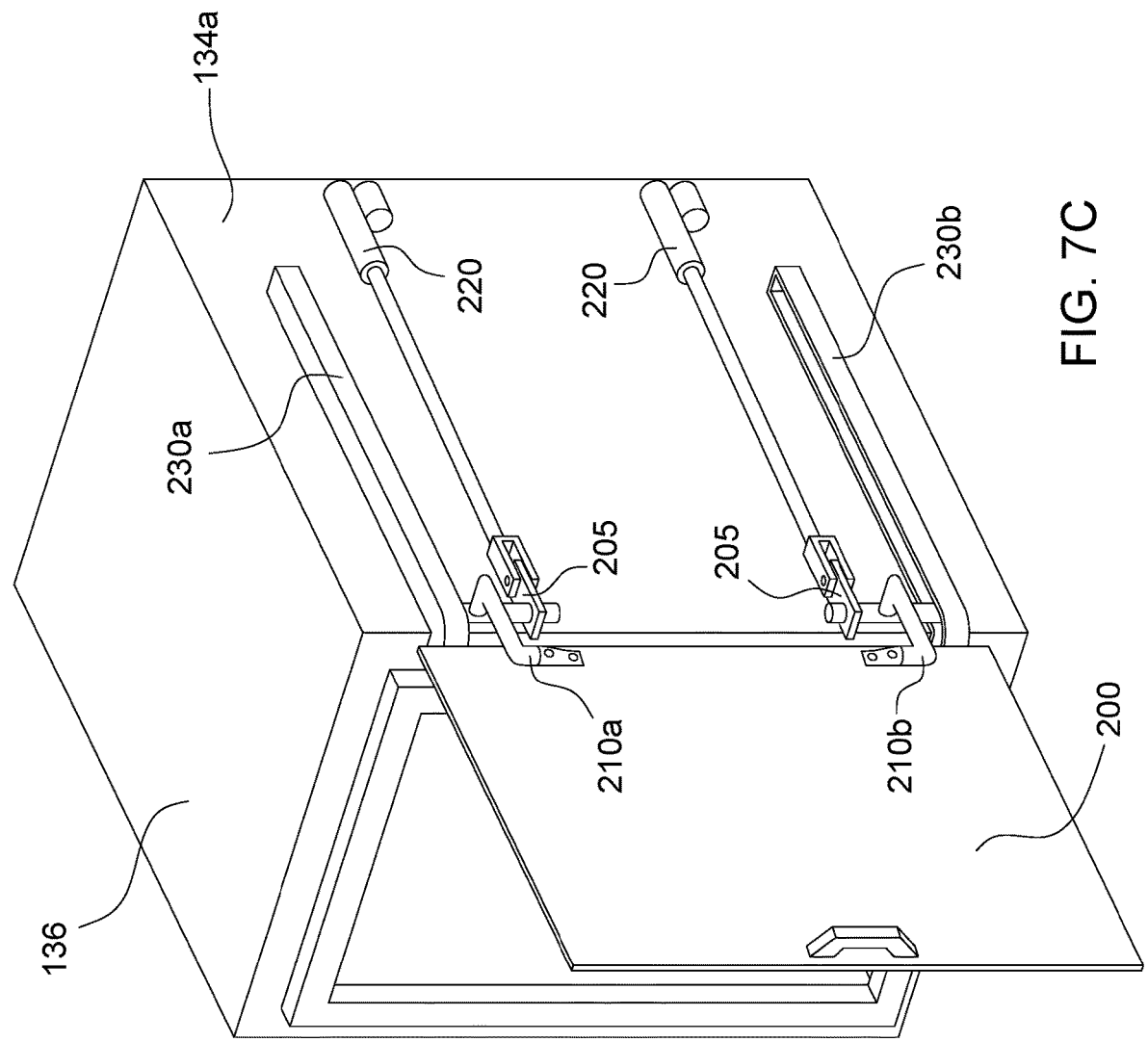
FIG. 7C illustrates a front perspective of the operator cab according to FIG. 6 wherein the door has been opened but not fully retracted alongside the cab.

Referring now to FIGS. 5-6, an exemplary drive system is provided for moving door 200 between open and closed positions. In one example, the drive system comprises two actuators 220 movably connected to tabs 205 extending from each of an upper pivot point 240*a* and lower pivot point 240*b*, each pivot point 240*a-b* being positioned within a pair of guide tracks 230*a-b*. Pivot points 240*a-b* may also have an upper hinge 210*a* and a lower hinge 210*b* extending from each of the upper pivot point 240*a* and lower pivot point 240*b*, respectively, to connect to and support the door 200 about the door opening defined by the second edges 142, 143 of side panels 134*a-b* and the second edge 146 of roof panel 136. In this example, the pivots points 240*a-b* are a fulcrum with hinges 210*a-b* and tabs 205 affixed thereon to generally form a bellcrank for converting a linear motion of the actuator 220 to a rotational movement for rotating the door 200 to open and closed positions. Further, the drive system may include at least one guide track 230*a-b* positioned proximate the door opening and extending alongside at least one of the side panels 134*a-b*. The guide tracks 230*a-b* help in both supporting the door 200 in the closed position about the door opening, the open position alongside left side panel 134*a* as well as the controlled movement of the door 200 between the closed and open positions using drive system.

Further, it can be contemplated by a skilled artisan however that guide tracks 230*a-b* may be positioned alongside either side panel 134*a-b*, the roof panel 136 or other structure associated with the cab 90 or chassis 100 to facilitate movement of the door 200 from the door opening to another position alongside or near the cab 90. For example, drive system and guide tracks 230*a-b* could be configured on roof panel 136 to move the door 200 from the door opening to a position on top of and generally parallel to roof panel 136. Such a position would allow for ingress and egress from the cab 90 while freeing up space within cab 90 and allowing for open door cab operations of skid steer 10.

Referring now to FIGS. 6, 7, 7A, 7B, 7C, 8, 8A and 8B, upon actuation of drive system, door 200 is moved about and around a pivot point 240*a-b* within guide tracks 230*a-b* to an open position between a boom arm 108 and alongside side panel 134*a* from the closed position, allowing for an operator to ingress and egress through the door opening. Conversely, the drive system can be actuated to reverse the movement of the door 200 from an open position to a closed position.

Actuation of the drive system may be initiated either manually by the operator or automatically by a cab sensor (not shown) upon the occurrence of some operator movement, e.g., when the operator attempts to exit the cab 90, enters the cab 90 or makes a defined gesture within the cab 90. A defined gesture may be, in one example, a predetermined movement pattern of the operator such as a foot or hand movement of the operator such as a kicking or wiping motion. The cab sensor may mounted in any number of arrangements within or outside of the cab 90 and also vary in type of sensor used. For example, the cab sensor may be a Hall effect sensor, infrared emitter, photodiode or other suitable sensor for sensing a movement or the position of the operator and/or the position of the door 200. For example, the cab sensor may be of a suitable type for generating a signal representative of the position or movement of the door 200, i.e., in a closed or open position. Both signals—the position or movement of the operator and the position or movement of the door 200—could then be sent to a onboard processor associated with the mobile work vehicle and then transmitted to an audio or visual output device. Examples of possible audio output devices include audio speakers, piezo electric beepers, and the like. Examples of possible visual output devices include light-emitting diode (LED) displays, liquid crystal diode (LCD) displays, and/or other known devices for providing visual door position information to a user.

Figure 8A:
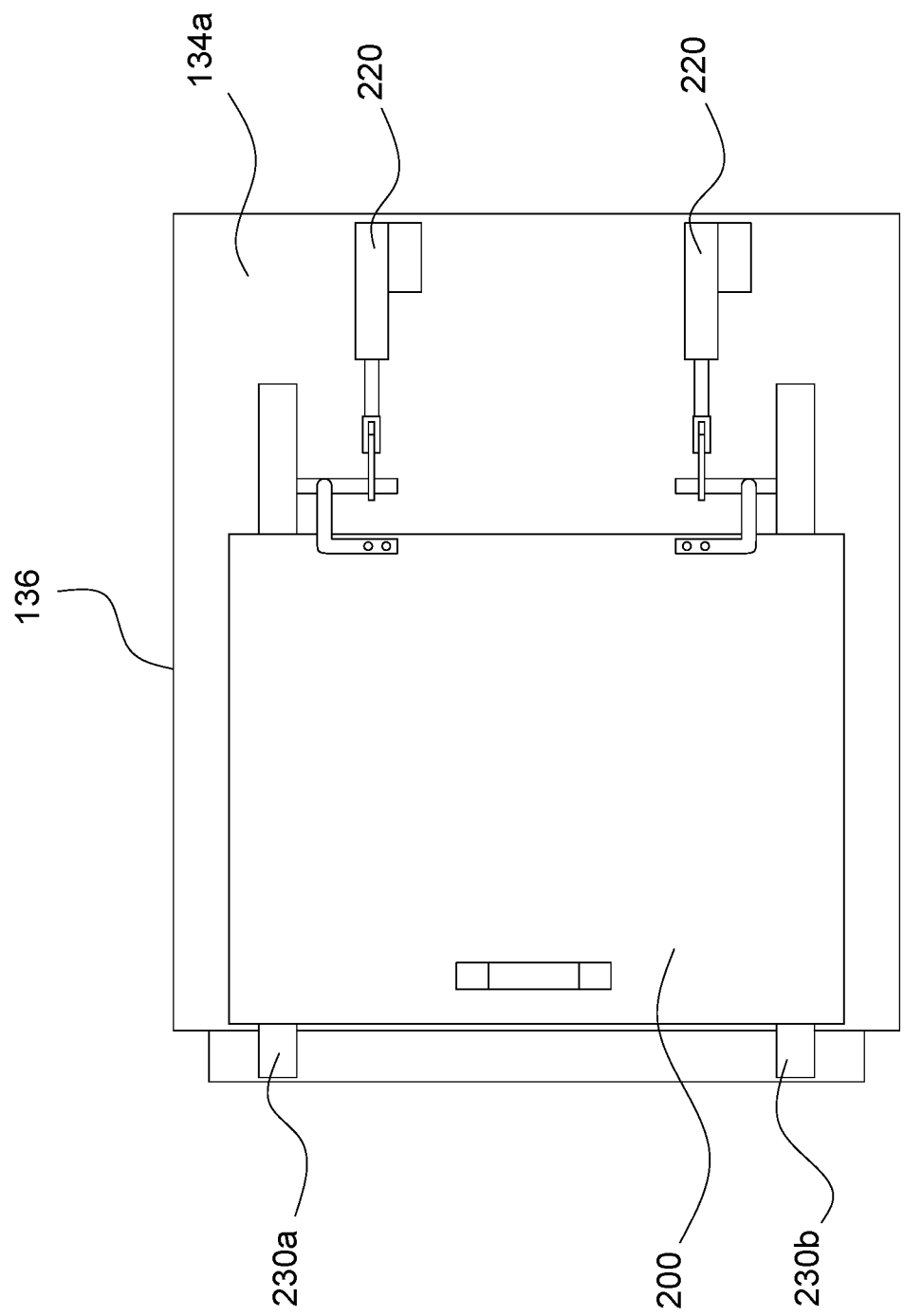
FIG. 8A illustrates a side elevation of the operator cab according to FIG. 6 wherein the door has been fully retracted alongside the cab.
Figure 8B:
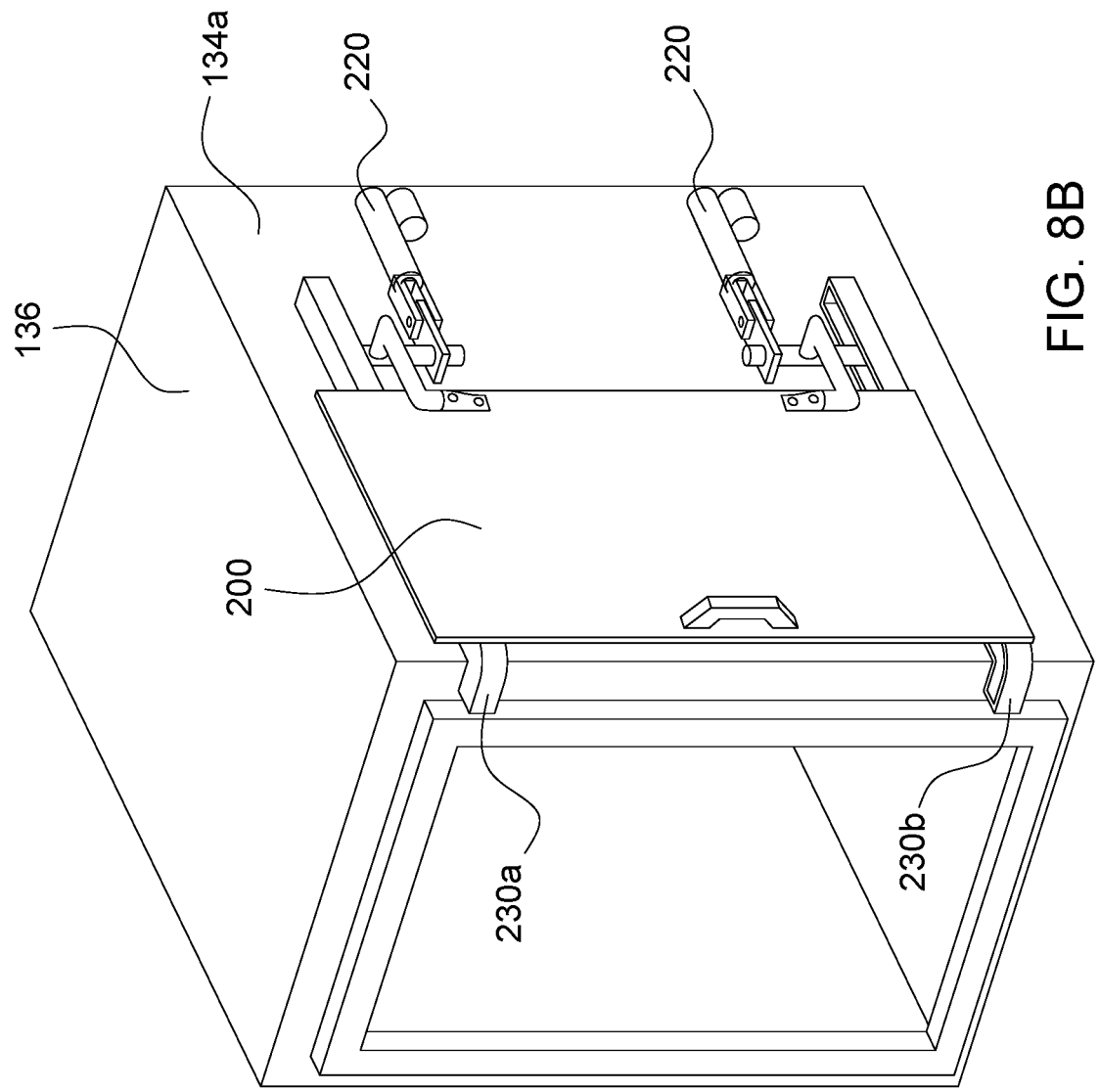
FIG. 8B illustrates a front perspective of the operator cab according to FIG. 6 wherein the door has been fully retracted alongside the cab.

As seen in FIG. 6, an operator may desire to exit the cab 90 when the door 200 is a closed position and actuate the drive system. Actuation of drive system will first cause a definable amount of retraction of the actuator 220 to rotate door 200 about pivot points 240*a-b* to the position shown in FIGS. 7A-C wherein the door 200 has moved away from the door opening and is generally parallel to but not yet alongside the left side panel 134*a*. Upon reaching the open position shown in FIGS. 7A-7C, the actuator 220 of drive system will further retract a definable amount to slide the door 200 within or along the guide tracks 230*a-b* to a closed position alongside left side panel 134*a* of cab 90 as best seen in FIGS. 8A-B. In this position, the door 200 is securely retained outside the cab 90 thus freeing up valuable space within the cab 90 and allowing for open door operations of the skid steer 10.

Similarly, an operator may enter and seat themselves within the cab 90 and actuate drive system to close the door 200. In this example, the process is reversed such that the door 200 is moved from the open position as shown in FIGS. 8 and 8A-B to the closed position shown in FIG. 6. Upon actuation of drive system, actuator 220 is extended a definable amount to: 1) slide the door 200 to a position near the end of the guide tracks 230*a-b* proximate second edge 142 of left side panel 134*a* and 2) upon reaching the end of the guide tracks 230*a-b*, rotating the door 200 to a closed position next to the door opening. Additionally, powering of the actuator 220 may be associated with use of operator seat, operator seat belt or operator lap bar within the cab 90. While in the closed position, the door 200 defines a rigid barrier and while in the open position, the operator can ingress or egress through the door opening.

Figure 9:
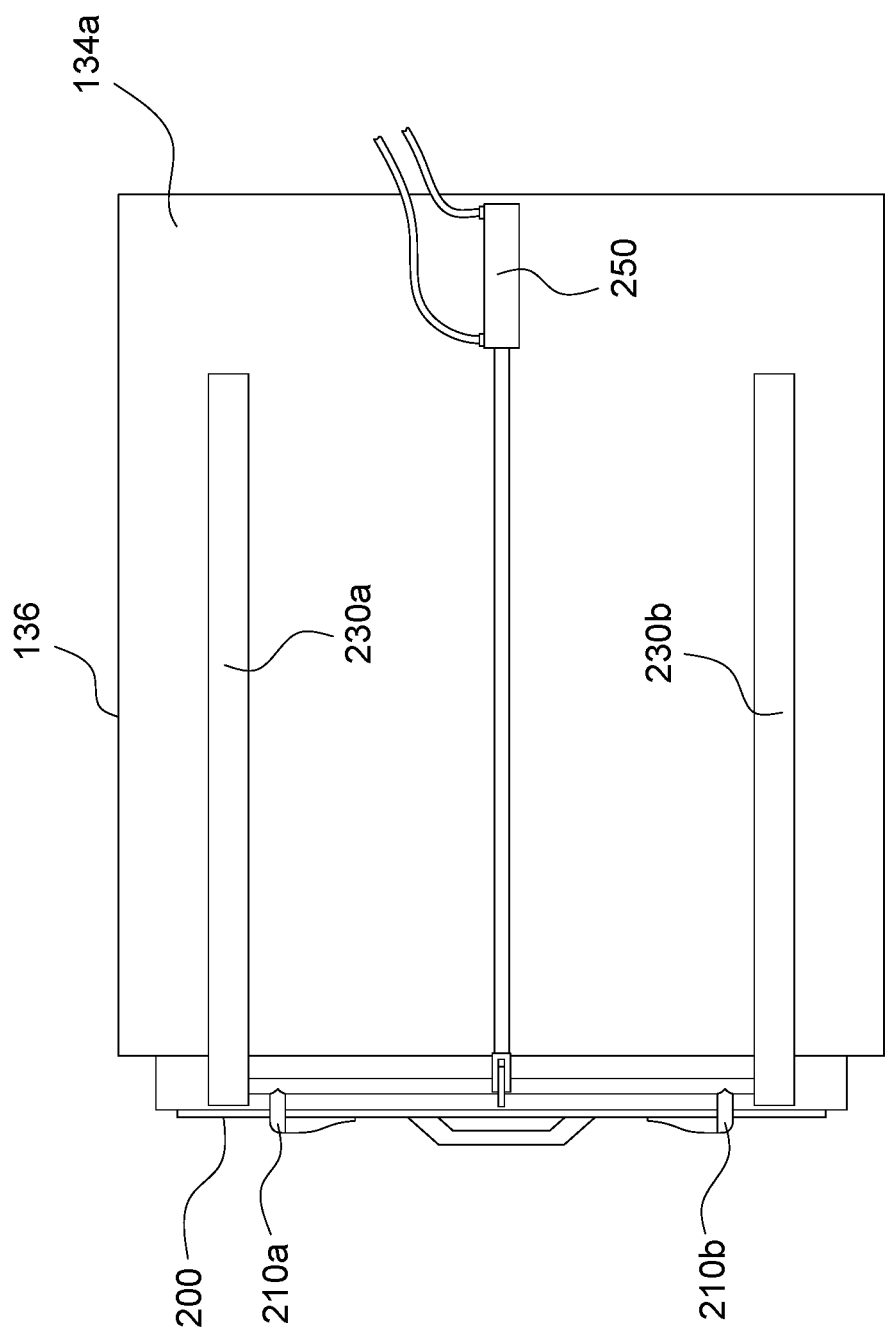
FIG. 9 illustrates a side elevation of an operator cab in accordance with another embodiment.
Figure 10:
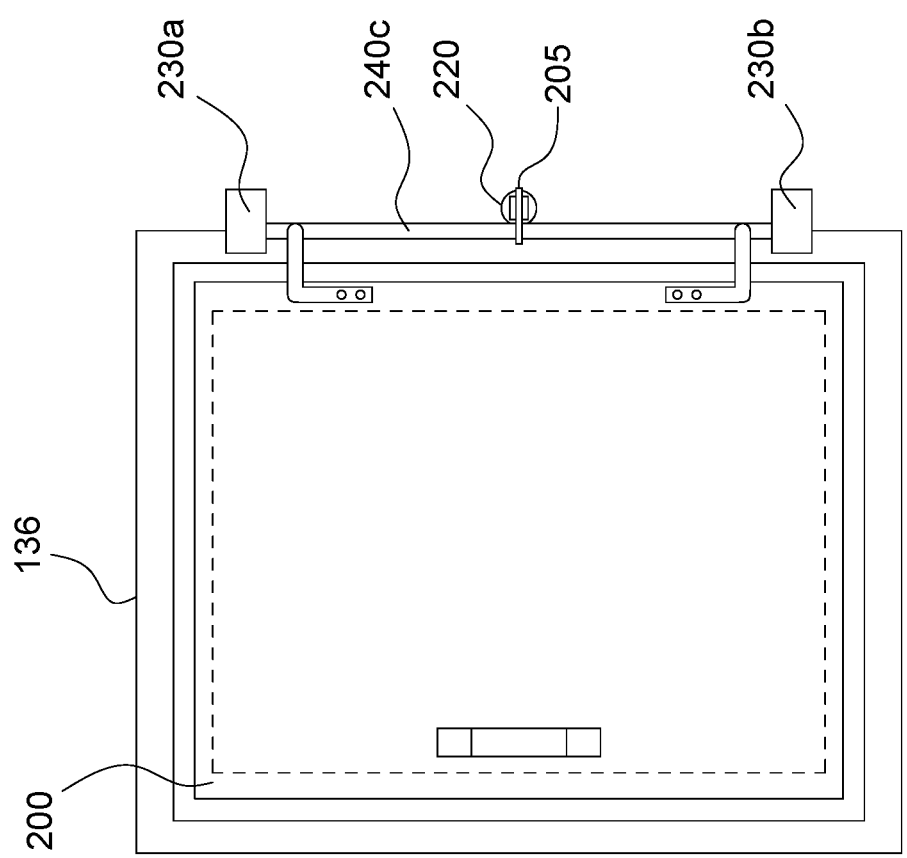
FIG. 10 illustrates a front elevation of an operator cab in accordance with another embodiment.

Referring now to FIGS. 9-10, another example is provided of the drive system utilizing a single hydraulic actuator 250 instead of dual actuators 220. The door 200 is again secured within guide track 230a-b at pivot points 240a-b; however, pivot point 240c is formed into a singular structure with only a single tab 205 used to rotate the door 200. Similarly, it can further be appreciated that the type, placement and number of the pivot point 240c, tabs 205 and window hinges 210a-b may vary according to the need. For example, single actuator 250 could be connected to only a single pivot point, tab and hinge (not shown) to support and move the door 200 in a controlled manner between open and closed positions.

Further, drive system may be connected to door 200 in any number of configurations. For example, door 200 may be secured lengthwise (top to bottom) to the drive system to allow for controlled movement within a corresponding guide track system. Alternatively, door 200 could be secured to the drive system in a diagonal manner or an end portion of door 200 may be provided with window hinges 210a-b to interface with drive system.

The actuator 200 may be a hydraulic or electric linear actuator, capable of actuation either automatically upon closing of the door 200 or manually by an operator. This actuation may be initiated through use of operator seat, operator seat belt or operator lap bar within the cab 90.

Figure 11:
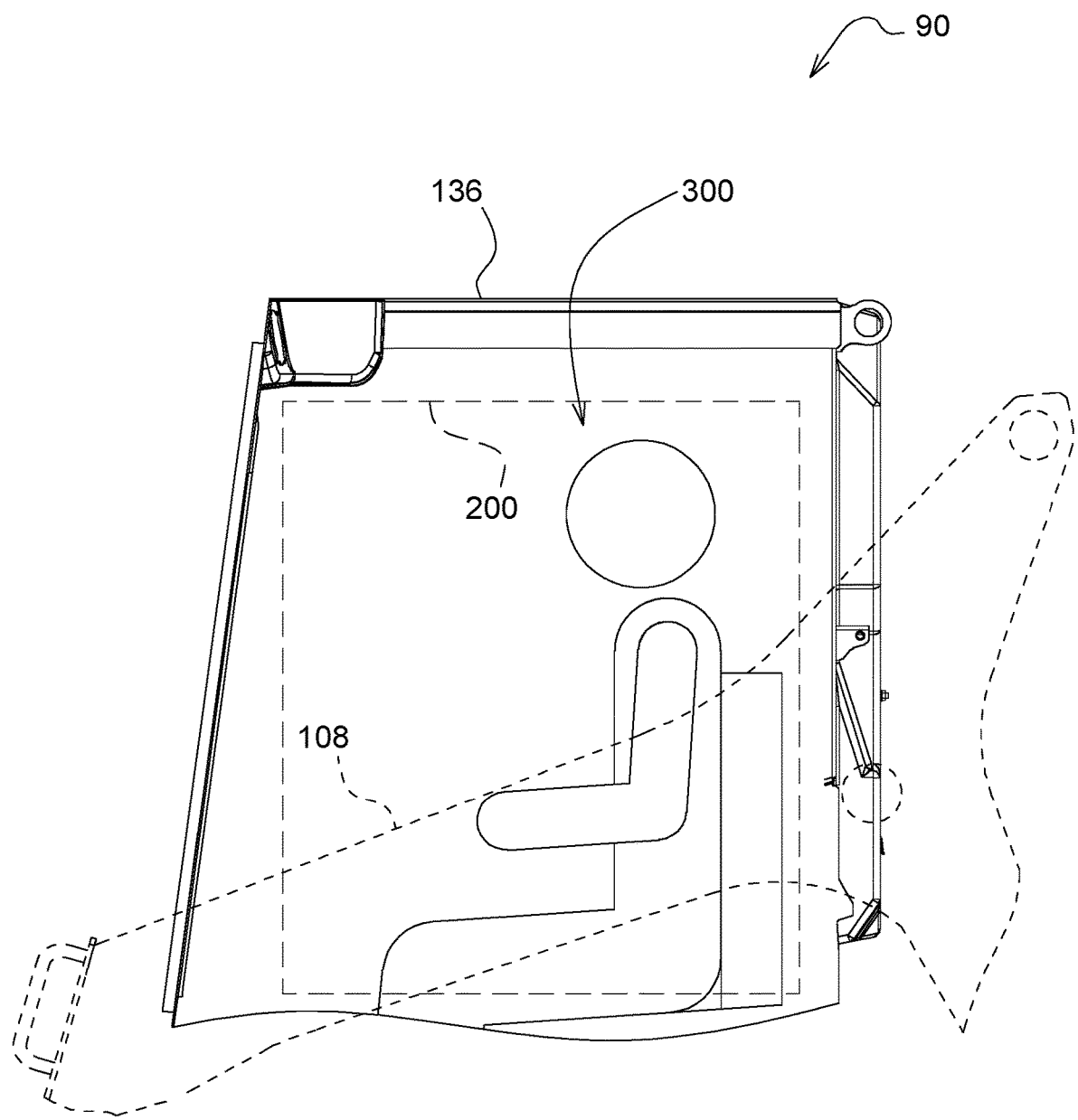
FIG. 11 illustrates a side elevation in partial cutaway of the operator cab and operator in accordance with an alternative embodiment.

With respect of FIG. 11 an operator 300 is shown inside the cab 90 of one embodiment. In this embodiment, the cab 90 is generally open with less clutter and increased visibility. Further, the operator can perform open door cab operations with full functionality of the skid steer 10 while the door 200 is secured between a boom arm 108 of the skid steer 10 and alongside left side panel 134a. In this manner, the door 200 can be positioned out of the way of operations and within the profile of the vehicle.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Without in any way limiting the scope, interpretation, or application of the claims appearing below, a technical effect of one or more of the example embodiments disclosed herein is an operator cab with sliding door for a mobile work vehicle. Another technical effect of one or more of the example embodiments disclosed herein is sliding door capable of being secured in an open position between a boom arm and a side panel of a mobile work vehicle. \While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. An operator cab mounted on a chassis of a mobile work vehicle, the cab comprising:
    a back panel, a pair of opposing side panels, and a roof panel, wherein the side panels and the roof panel each have a first edge proximate the back panel and a second edge opposite the first edge, the second edges defining a door opening;
    a door proximate the door opening, the door defining a front barrier when in a closed position; and
    a drive system connected to the door, upon actuation the drive system pivoting the door about a pivot point near the door opening and then moving the door to an open position between at least one of the side panels and a boom arm of the mobile work vehicle and allowing for an operator to operate the mobile work vehicle while the door is in the open position.

2. The drive system of claim 1 further comprising at least one hydraulic cylinder.

3. The cab of claim 1 further comprising a guide track mounted to at least one of the side panels, the guide track allowing for pivoting of the door about the pivot point and subsequent movement within the guide track from the closed position to the open position between the boom arm and alongside at least one of the side panels.

4. The cab of claim 1 wherein the pivot point further comprises a tab and a hinge affixed thereon, the pivot point connecting the drive system to the door and translating linear movement of the actuator to move the door from the closed or open positions.

5. The cab sensor of claim 1, wherein the movement of the door to the closed position is automatically actuated based on an operator movement.

6. The cab sensor of claim 1, wherein the movement of the door to the open position is automatically actuated based on an operator movement.

7. The cab of claim 1, wherein the movement of the door is manually actuated based on an operator movement.

8. A method for opening and closing an operator cab of a mobile work vehicle, the method comprising the steps of:
    providing a back panel, a pair of opposing side panels, and a roof panel, wherein the side panels and the roof panel each have a first edge proximate the back panel and a second edge opposite the first edge, the second edges defining a door opening;
    providing a door proximate the door opening in a closed position, the door connected to a drive system;
    pivoting, with the drive system, the door about a pivot point near the door opening;
    moving, with the drive system, the door between a boom arm of the mobile work vehicle and at least one of the side panels to an open position; and
    operating the mobile work vehicle with the door in the open position, the open position allowing for improved visibility during operation.

* * * * *